(12) United States Patent
Sujan et al.

(10) Patent No.: US 9,194,309 B2
(45) Date of Patent: Nov. 24, 2015

(54) SYSTEM AND METHOD FOR ROUTE IDENTIFICATION USING A LOW COST GPS SYSTEM (71) Applicants: Vivek A. Sujan, Columbus, IN (US); An Wu, Columbus, IN (US); Phani Vajapeyazula, Columbus, IN (US); Kenneth Follen, Greenwood, IN (US); Howard R. Frost, Columbus, IN (US); Suk-Min Moon, Greenwood, IN (US); Jaidev Khatri, Columbus, IN (US)

(72) Inventors: Vivek A. Sujan, Columbus, IN (US); An Wu, Columbus, IN (US); Phani Vajapeyazula, Columbus, IN (US); Kenneth Follen, Greenwood, IN (US); Howard R. Frost, Columbus, IN (US); Suk-Min Moon, Greenwood, IN (US); Jaidev Khatri, Columbus, IN (US)

(73) Assignees: Cummins Intellectual Properties, Inc., Minneapolis, MN (US); PACCAR, Inc., Bellevue, WA (US); Eaton Corporation, Cleveland, OH (US)

(*) Notice: Subject to any disclaimer, the term of this patent is extended or adjusted under 35 U.S.C. 154(b) by 0 days.

(21) Appl. No.: 14/185,718

(22) Filed: Feb. 20, 2014

(65) Prior Publication Data
US 2014/0236434 A1 Aug. 21, 2014

Related U.S. Application Data (60) Provisional application No. 61/767,492, filed on Feb. 21, 2013.

(51) Int. Cl.
F02D 29/02 (2006.01)
G01S 19/48 (2010.01)

(52) U.S. Cl.
CPC ............ *F02D 29/02* (2013.01); *G01S 19/48* (2013.01)

(58) Field of Classification Search
CPC ......... F02D 29/02; G01S 19/48; B60K 23/00; G08G 1/00
USPC ............ 701/54, 58, 33.4, 468, 540; 705/7.38, 705/7.11; 340/439, 936
See application file for complete search history.

(56) References Cited

U.S. PATENT DOCUMENTS

| | | | |
|---|---|---|---|
| 5,742,922 A | 4/1998 | Kim | |
| 6,944,532 B2 | 9/2005 | Bellinger | |
| 7,454,284 B2 | 11/2008 | Fosseen | |
| 7,512,487 B1 | 3/2009 | Golding et al. | |
| 7,783,417 B2* | 8/2010 | Vavrus | 701/423 |
| 7,877,198 B2 | 1/2011 | Tenzer et al. | |
| 7,899,610 B2 | 3/2011 | McClellan | |
| 7,908,076 B2* | 3/2011 | Downs et al. | 701/117 |
| 8,155,868 B1* | 4/2012 | Xing et al. | 701/123 |
| 2006/0155464 A1* | 7/2006 | Smartt | 701/208 |
| 2008/0125958 A1* | 5/2008 | Boss et al. | 701/123 |
| 2009/0177360 A1* | 7/2009 | Kustosch | 701/45 |
| 2010/0070128 A1 | 3/2010 | Johnson | |
| 2011/0161138 A1* | 6/2011 | Keaveny et al. | 705/7.38 |

(Continued)

Primary Examiner — Tan Q Nguyen
(74) Attorney, Agent, or Firm — Foley & Lardner LLP (57) ABSTRACT A system and method for identifying and analyzing a route using an inexpensive GPS system is provided. The system and method provides a location for storing GPS and vehicle operating data for at least one route, requiring a plurality of runs over the at least one route. Once a predetermined minimum number of runs have been reached, the system and method define a route segment, interpolate additional data points using the GPS and vehicle operating data, synchronize the data over the plurality of runs, and analyze the data. The analyzed data is then provided to a module capable of controlling the operation of an internal combustion engine. The analyzed data is forward-looking in that it permits anticipation of vehicle operation, and more particularly, engine and transmission operation.

16 Claims, 3 Drawing Sheets (56) References Cited

U.S. PATENT DOCUMENTS

| | | |
|---|---|---|
| 2011/0258044 A1 | 10/2011 | Kargupta |
| 2012/0197500 A1 | 8/2012 | Sujan et al. |
| 2012/0197501 A1 | 8/2012 | Sujan et al. |
| 2012/0197504 A1 | 8/2012 | Sujan et al. |
| 2012/0203434 A1 | 8/2012 | Sujan et al. |
| 2012/0216509 A1 | 8/2012 | Sujan et al. |
| 2012/0221217 A1 | 8/2012 | Sujan et al. |
| 2012/0221234 A1 | 8/2012 | Sujan et al. |

* cited by examiner

SYSTEM AND METHOD FOR ROUTE IDENTIFICATION USING A LOW COST GPS SYSTEM

CROSS-REFERENCE TO RELATED APPLICATION

This application claims the benefit of priority of U.S. Provisional Patent Application No. 61/767,492, entitled "SYSTEM AND METHOD FOR ROUTE IDENTIFICATION USING A LOW COST GPS SYSTEM," filed Feb. 21, 2013, which is incorporated herein by reference in its entirety.

TECHNICAL FIELD

This disclosure relates to a system and method for acquiring route data using a low-cost Global Positioning System (GPS), performing a statistical analysis of the data, and using the data to control an internal combustion engine.

BACKGROUND

Using route information can help improve the efficiency of operation of a vehicle. However, existing high resolution databases are expensive and keeping those databases current can be time-consuming, can require additional records to track vehicles that have been updated, and can keep the vehicles out of service when updating the databases.

SUMMARY

One embodiment relates to a route identification system that includes a GPS unit, a storage unit, and a processor. The GPS unit is adapted to receive GPS data during an instance of a vehicle traveling a route. The processor is configured to collect vehicle operating data during the instance of the vehicle traveling the route. The storage unit is adapted to receive the GPS and vehicle operating data in a non-transitory, computer-readable medium. The processor is further configured to control operation of a vehicle device during a subsequent instance of the vehicle traveling the route based on the GPS and vehicle operating data collected for a plurality of positions of the route during the prior instance of the vehicle traveling the route.

Another embodiment relates to a route identification system that includes a processor configured to collect GPS data during an instance of a vehicle traveling a route; collect vehicle operating data during the instance of the vehicle traveling the route; interpolate the GPS and vehicle operating data between adjacent received GPS and vehicle operating data points for each route in the plurality of routes; and analyze the GPS and vehicle operating data to control operation of a vehicle device during a subsequent instance of the vehicle traveling the route based on the GPS and vehicle operating data collected for a plurality of positions of the route during the prior instance of the vehicle traveling the route.

Still another embodiment relates to a computer-readable storage medium having machine instructions stored therein, the instructions being executable by a processor to cause the processor to perform operations including: receiving GPS and vehicle operating data during an instance of a vehicle traveling a route in a plurality of routes; interpolating the GPS and vehicle operating data between adjacent received GPS and vehicle operating data points for each route in the plurality of routes; synchronizing the interpolated GPS and vehicle operating data to correspond with a specific route in the plurality of routes; analyzing the interpolated and synchronized GPS and vehicle operating data over a plurality of runs of each route in the plurality of routes; and providing the interpolated, synchronized, and analyzed GPS and vehicle operating data to a controller to control operation of a vehicle device during a subsequent instance of the vehicle traveling the route, wherein the control is based on the GPS and vehicle operating data collected for a plurality of positions during the prior instance of the vehicle traveling the route.

Advantages and features of the embodiments of this disclosure will become more apparent from the following detailed description of exemplary embodiments when viewed in conjunction with the accompanying drawings.

DETAILED DESCRIPTION

Figure 1:
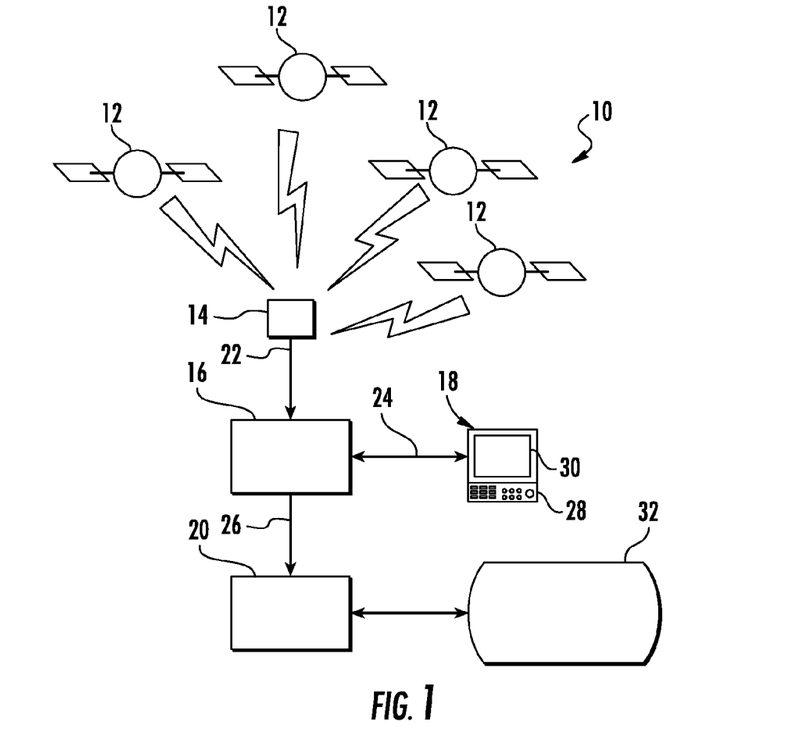
FIG. 1 is a view of a route identification system in accordance with an exemplary embodiment of the present disclosure.

Referring to FIG. 1, a route identification system incorporating a low-cost GPS is shown as a simplified schematic and generally indicated at 10. Route identification system 10 receives signals from a plurality of GPS satellites 12, which route identification system 10 uses to provide the location of system 10. While GPS systems work for many useful purposes, such as planning of routes and general location, GPS systems, particularly low-cost systems, are subject to significant noise that make the data from such systems generally useless for controlling a vehicle, which includes an internal combustion engine and a transmission. Even more importantly, inexpensive GPS systems have high levels of uncertainty in altitude data, which is important with respect to acceleration and deceleration profiles going up and down hills. Route identification system 10 provides a system and method for acquiring position data based on the movement of a specific vehicle from a GPS system, including latitude, longitude, and altitude, matching the position data over multiple runs over the same route for that vehicle, and analyzing the data to provide a result that is useable to control certain systems of the vehicle, such as an internal combustion engine and a transmission. Thus, the system 10 uses data collected from operation of a vehicle, and not extracted from various existing databases. Accordingly, because the data is specific to the vehicle, the system's 10 control of the vehicle is based on actual conditions experienced by that vehicle, such that the control process are specific to that vehicle, which is useful in, for example, optimizing fuel efficiency.

Route identification system 10 includes a GPS unit 14, a data storage and analysis unit 16, and an operator unit 18. Route identification system 10 may provide raw data, preprocessed data, or analyzed data to a processor (e.g., Cycle Efficiency Management (CEM) module 20), which provides data to a controller of an internal combustion engine. In some embodiments, CEM module 20 controls operation of a vehicle device. The vehicle device may include an internal combustion engine 32, and may also control one or more functions of a transmission associated with engine 32, based on the processed GPS data. The vehicle device may further include a display unit (e.g., operator unit 18) for an operator of the vehicle that provides information or instructions to the operator based on the route data (e.g., depress the accelerator pedal in anticipation of the upcoming hill to minimize fuel consumption versus a relatively larger depression while traveling the hill). In an exemplary embodiment, GPS unit 14 is a CANGPS data logger that provides GPS information via a controller area network (CAN) bus 22, enabling connection of GPS unit 14 to data storage and analysis unit 16 and to test equipment (not shown). In another embodiment, GPS unit 14 may be any GPS unit that permits connecting GPS information to data storage and analysis unit 16. While GPS unit 14 may be a separate unit from data storage and analysis unit 16, GPS unit 14 may also be a part of data storage and analysis unit 16.

Data Storage and Analysis Unit (DSAU) 16 provides two functions. First, DSAU 16 provides a location to store route data from GPS unit 14. Second DSAU 16 may provide pre-processing of route data prior to transmission of the route data or signals to CEM module 20. The route data may include GPS data and vehicle operating data. The vehicle operating data may be recorded and measured from operation of the vehicle on a route. While DSAU 16 may be a separate unit from CEM module 20, DSAU 16 may also be a part of CEM module 20. DSAU 16 communicates with operator unit 18 via an appropriate display communication cable 24, which may be a bus, including a CAN bus. Though communication between operator unit 18 and DSAU 16 may be via a physical cable, such communication may also be a wireless connection through RF transmitters and receivers, or an optical connection, including digital infrared and other frequency transmitters and receivers. If DSAU 16 is separate from CEM module 20, then DSAU 16 may connect to CEM module 20 by way of a CEM communication cable 26, which may by a bus, a wireless connection, or an optical connection.

As mentioned above, the vehicle device may include an operator unit 18. The operator unit 18 includes an operator interface portion 28 and may provide an operator display portion 30. For example, the operator unit 18 may include a dashboard monitor, where an operator can view vehicle operating information and input information (e.g., torque limits, fuel efficiency goals, etc.). Operator interface portion 28 provides an operator with the ability to communicate with route identification system 10, which is beneficial to certain operational aspects of route identification system 10, described further hereinbelow. Optional operator display portion 30 provides the ability to display route data, and may display other information, such as engine and transmission performance data, including how an engine and associated transmission are responding during the route. Moreover, the operator display portion 30 may provide instructions to the operator of the vehicle based on the route data.

CEM module 20 is part of an internal combustion engine that employs control processes to furnish an operator with anticipated and currently desired vehicle operational behavior to optimize fuel economy. In one embodiment, the CEM module 20 may include one or more processors that provide instructions to the operator for the operator to control the vehicle to achieve one or more desired vehicle operating characteristics (e.g., to optimize fuel economy). In another embodiment, the CEM control processes control various vehicle devices, such as powertrain components including the internal combustion engine, transmission, accessories, final drive, wheels, and vehicle (not shown). CEM module 20 may be similar to the CEM module described in U.S. application Ser. No. 13/336,955, filed on Dec. 23, 2011, and published as U.S. Pub. No. 2012-0197500; U.S. application Ser. No. 13/336,959, filed on Dec. 23, 2011, and published as U.S. Pub. No. 2012-0197501; U.S. application Ser. No. 13/336, 950, filed on Dec. 23, 2011, and published as U.S. Pub. No. 2012-0197504; U.S. application Ser. No. 13/345,642, filed on Jan. 6, 2012, and published as U.S. Pub. No. 2012-0203434; U.S. application Ser. No. 13/407,583, filed on Feb. 28, 2012, and published as U.S. Pub. No. 2012-0216509; U.S. application Ser. No. 13/407,715, filed on Feb. 28, 2012, and published as U.S. Pub. No. 2012-0221217; and U.S. application Ser. No. 13/349,472, filed on Jan. 12, 2012, and published as U.S. Pub. No. 2012-0221234; each of the identified applications is incorporated herein by reference in its entirety.

During operation, route identification system 10 receives signals from the plurality of GPS satellites 12 based on the movement of a vehicle along a route. More specifically GPS unit 14 receives signals from the plurality of GPS satellites 12. GPS unit 14 provides information (i.e., GPS data) in terms of latitude, longitude, and altitude to DSAU 16 for the vehicle. GPS unit 14 may provide additional information to DSAU 16, for various locations (i.e., positions) along a route, such as estimated delays, distance to end point and distance to changes in speed, road curvature, vehicle speed limits, road type, fueling locations, and other information that may be derived from the GPS data.

DSAU 16 provides a storage location for route data, provides pre-processing of GPS and vehicle operating data, and may provide processing of the GPS and vehicle operating data. Because multiple runs over the same route are required, which will be explained further hereinbelow, DSAU 16 organizes the route data (i.e., the GPS and vehicle operating data) by route, and maintains a route database. DSAU 16 also performs pre-processing of GPS and vehicle operating data, described further hereinbelow, which includes interpolating location data between the data locations provided by GPS unit 14, and matching the data between route runs. DSAU 16 may also calculate route slopes, road curvatures, and other parameters of a route based on the GPS data. To assist DSAU 16 in identification of routes, an operator may indicate, typically the first time a vehicle travels over a route, the start and end of a route by way of operator unit 18. Using operator interface portion 28, an operator is able to indicate the start of a frequently used route, and the end of the same frequently used route. An operator may also be able to choose from among a plurality of routes having a common starting point. Operator display portion 30 may display alternative route selections, engine and transmission performance, and other vehicle information.

CEM module 20 provides control parameters for a vehicle device (e.g., physically controlling internal combustion engine 32 and/or providing instructions to an operator to control the vehicle). While CEM module 20 may be a standalone module or unit, CEM module 20 may be a module that is a part of an electronic control module (ECM) or other processor included in engine 32 and/or separate from engine 32. Accordingly, the CEM module may utilize various engine sensors within the vehicle. By doing so, the CEM module may collect the vehicle operating data over a route of the vehicle. The vehicle operating data may include, for various locations/positions along a route, an indication of at least one of when up shifting and down shifting occur (and to what gears), a torque and engine speed, an engine temperature, an environmental temperature, stop-and-go and/or start-and-stop locations, etc. As such, the CEM module 20 may use the vehicle operating data to determine engine operating characteristics throughout the route. In connection, the CEM module 20 may use the GPS data to determine characteristics of the route to, basically, map the route (as mentioned above, for example, posted speed limits, road curvatures, road grade, etc.). By using both GPS data and vehicle operating data, the CEM module 20 may determine when certain functions should occur. For example, if the vehicle is travelling a route with an uphill portion, the GPS data may be used to determine when the uphill portion is coming, whether traffic is currently there, and an average vehicle speed (based on the previous runs of the route). Accordingly, the torque of the engine may be adjusted to reflect the upcoming uphill portion.

Many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by machine-readable instructions, such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units that perform particular functions. It should be understood that these modules and units are merely schematically illustrated based on their function for clarity purposes, and do not necessarily represent specific hardware or machine-readable instructions. In this regard, these modules, units and other components may be hardware and/or machine-readable instructions implemented to substantially perform their particular functions explained herein. The various functions of the different components can be combined or segregated as hardware and/or as machine-readable instructions in any manner, and can be useful separately or in combination. Thus, the various aspects of the disclosure may be embodied in many different forms, and all such forms are contemplated to be within the scope of the disclosure.

With this background, by way of example, if a vehicle only travels around the State of Arizona, the route data received will correspond with where that vehicle traveled in Arizona and not anywhere the vehicle did not travel. Accordingly, the route data received by the GPS unit 14 will differ for each application of the system 10 (e.g., from vehicle-to-vehicle). Moreover, the CEM module 20 control processes are personal/specific to each system 10 application. For example, if a truck driver drives an identical route to Florida from Wisconsin each week (Monday-Thursday), the route data is specific to that route for that truck. After a predefined number of runs of the route (described more fully herein), the collected route-specific data is used to determine various features of the route (e.g., when/where uphill and downhill portions are encountered, where the most wind resistance is usually experienced, when/where the driver stops for fuel, etc.). Over time, additional runs of the route may be used to acquire additional route data to further refine the route-specific data.

Concurrently, the CEM module 20 may acquire vehicle operating data over the route. In turn, the CEM module 20 may use the collected route data to control certain systems of the truck (e.g., a powertrain component). For example, the CEM module 20 may adjust the torque output of the engine lower when the truck reaches a downhill portion of the route in order to maximize fuel efficiency. Thus, the system 10 is supplied with GPS data (and vehicle operating data) from operation of a vehicle and does not require data, for example GPS data, from third-parties.

Figure 2:
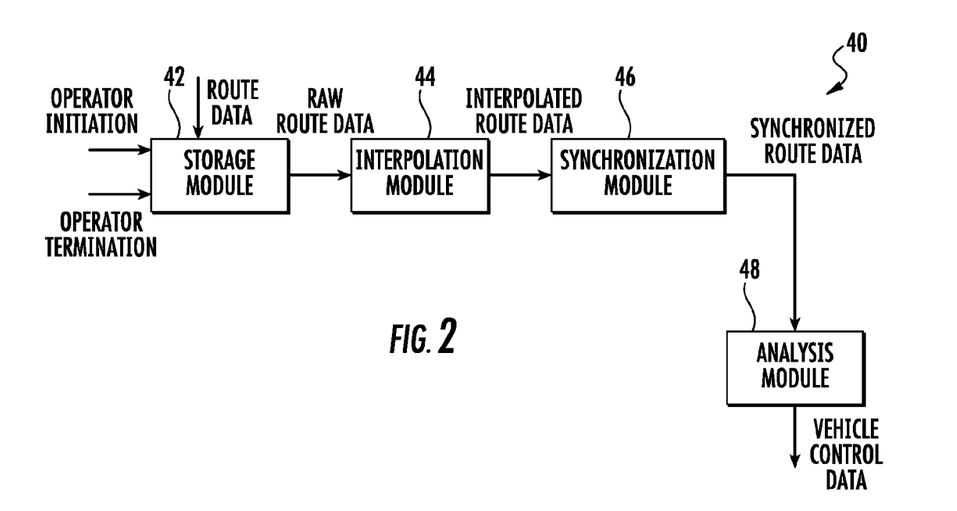
FIG. 2 is a Data Storage, Processing, and Analysis (DSPA) module of the route identification system of FIG. 1 in accordance with an exemplary embodiment of the present disclosure.

Route identification system 10 includes a process that analyzes GPS data from GPS unit 14. Turning now to FIG. 2, a Data Storage, Processing, and Analysis (DSPA) module 40 of route identification system 10 in accordance with an exemplary embodiment of the present disclosure is shown. DSPA module 40 includes a storage module 42, an interpolation module 44, a synchronization module 46, and an analysis module 48. The various modules of DSPA module 40 may be positioned in at least one of DSAU 16 and CEM module 20, and may be positioned in other locations having the features and capabilities described hereinbelow.

Storage module 42 receives an operator initiation signal from operator interface portion 28, an operator termination signal from operator interface portion 28, GPS data from GPS unit 14, and vehicle operating data from CEM module 20. When storage module 42 receives the operator initiation signal, storage module 42 assigns a route number to a file, and begins storing GPS and vehicle operating data until storage module 42 receives operator termination signal, which defines a route that an operator anticipates will be repeated. Any time storage module 42 recognizes the same location in the future, along with the same direction of travel, storage module 42 will begin saving GPS and vehicle operating data for the route. Thus, storage module 42 stores multiple runs of data for the same route. Once storage module 42 has stored a predetermined minimum number of runs over the same route, which in the exemplary embodiment is ten runs, then storage module 42 sends the route data to interpolation module 44. While storage module 42 will continue to store run data for each future run, once storage module 42 has stored data for the predetermined minimum number of runs, then there is sufficient data to control the operation of engine 32 once the data has been further analyzed, described further hereinbelow.

GPS unit 14 provides data at predetermined, timed intervals. Because the intervals are fixed, the distance between data points increases with vehicle speed. At high vehicle speeds, the distance between data points may be 30 meters or more. Because data is unlikely to be generated at the same locations during each run, merely averaging the data from each run will yield distorted and inaccurate data. To reduce the effects of data spacing, route identification system 10 provides certain pre-processing of the data from GPS unit 14. The first pre-processing step is to choose one of the runs as a baseline run. The next step in the process is to reduce a run into a route segment. In the exemplary embodiment, route identification system 10 uses the haversine distances in a neighborhood search to determine the start of a run segment and the end of a run segment, which defines the baseline run segment as well as the other run segments for the route that will be processed further. Other techniques for determining neighborhood points and ground truth distances, which is matching of sensed features to actual features, in place or in combination with haversine distances include, but are not limited to, a vincenty distance determination method, a spherical law of cosines distance determination method, etc.

In one embodiment, the CEM module 20 also collects vehicle operating data at predetermined, timed intervals. Accordingly, the distance between the vehicle operating data points may increase with vehicle speed. Route identification system 10 provides analogous pre-processing to the vehicle operating data to curtail inaccurate and distorted data. The vehicle operating data is collected for the length of the route. In various other embodiments, the CEM module 20 collects the vehicle operating data in real-time, such that interpolation of the vehicle operating data is unnecessary.

Figure 3:
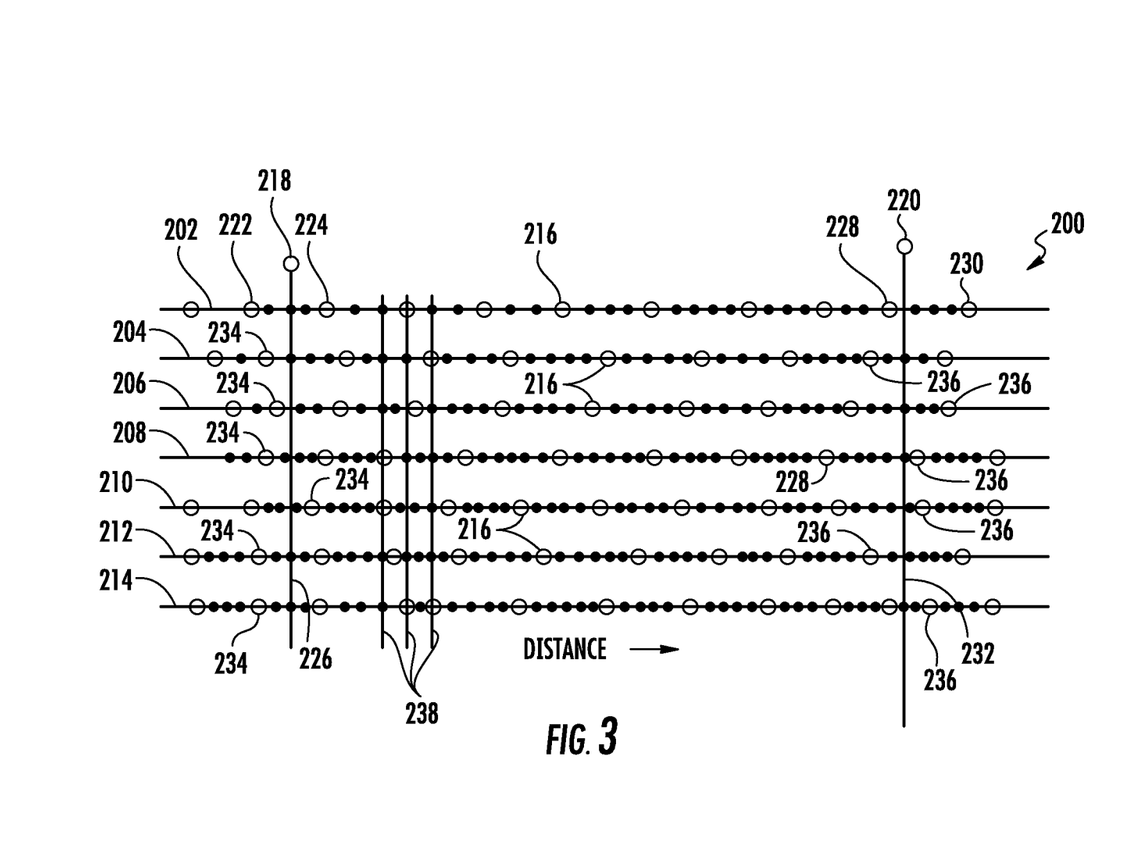
FIG. 3 is a diagram representing exemplary data acquired and analyzed using the DSPA module of FIG. 2.

Referring next to FIG. 3, a route data graph 200 is shown. Route data graph 200 includes a series of route runs #1 202, #2 204, #3 206, #4 208, #5 210, #6 212, and #7 214. For convenience, route run #1 202 is also baseline run 202. Although FIG. 3 is described in regard to GPS data, the processes described herein in regard to GPS data may, in some embodiments (when the vehicle operating data is not continuously acquired), be applicable to the acquisition and processing of the vehicle operating data. Accordingly, referring back to FIG. 3, data points from GPS unit 14, which may be described as GPS unit data, are represented by open circles 216. As previously noted, each GPS data point 216 includes at least latitude, longitude and altitude data. Each route run 202, 204, 206, 208, 210, 212, and 214 are shown as straight lines with each GPS data point 216 located at varying distances in a horizontal direction in FIG. 3, with the distance increasing from left to right. Also shown on route data graph 200 are an operator start or initiation point 218 and an operator stop or termination point 220. As previously noted, the distance to GPS data points 216 from start point 218 and stop point 220 are found, seeking a point of inflection that determines points on either side of either start point 210 or stop point 220. These distances may be found through a variety of techniques, including the use of haversine distances and other geometric calculations (e.g., vincenty calculations). In the case of baseline run 202, GPS data point 222 is on one side of start point 218 and GPS data point 224 is on the opposite side of start point 218 from the perspective of a line 226 that extends perpendicularly to route run #1 202 data line. Further, GPS data point 228 is on one side of stop point 220 and GPS data point 230 is on the opposite side of stop point 220 from the perspective of a line 232 that extends perpendicularly to route run #1 202 data line. The data point that is closest to start point 218 forms the beginning of each segment. The start of each segment in FIG. 3 is labeled as a segment start point 234 and the end of each segment in FIG. 3 is labeled as a segment end point 236. Once all segment start points 234 and segment end points 236 are determined, all data to the left of segment start points 234 and all data to the right of segment end points 236 are discarded. Thus, each run segment is defined by data that extends from each segment start point 234 to each segment end point 236, which includes each segment start points 234 and each segment end point 236.

Now that the segments have been defined, the next step is to interpolate the existing GPS data (and vehicle operating data when it is not acquired continuously along a route) into the regions between the existing data points for the reference or baseline segment. While interpolation may be made at any interval, in the exemplary embodiment, interpolation of baseline run 202 was performed at one meter haversine distances or intervals in interpolation module 44. As previously noted, other geometric calculations may be performed in place of haversine calculations. Data interpolation is conducted using the adjacent data points, and may also be analyzed using data from other runs, which helps to reduce noise and errors in the data because the data from the other runs helps the process to interpolate the data more accurately. Once baseline run 202 has been interpolated, all subsequent route runs 204, 206, 208, 210, 212, and 214 are processed to interpolate data between GPS data points 216. In the exemplary embodiment, the interpolation of all runs after baseline run 202 is conducted at about one-third the haversine angle of the baseline run, which is 9.4243e-006 degrees, and which is approximately equivalent to the previously described one meter spacing. Thus, the interpolation of runs subsequent to baseline run 202 is performed at approximately one-third meter distances and may be described as densely interpolated. Once all run data has been interpolated, interpolation module 44 sends all route data in the defined route segments to synchronization module 46. As the vehicle runs additional runs of the route, however, the additional GPS (and vehicle operating) data decreases the need for interpolation because the additional data points fill in the gaps between the previously collected data points.

One challenge in analyzing data from a low-cost GPS unit is synchronizing or matching data between runs to assure data points are as closely matched between runs as possible. Matching or synchronizing data between runs is the function of synchronization module 46. Synchronization module 46 performs the same distance calculation from each data point of baseline run 202 to each available data point of route run 204, route run 206, etc., determining through a geometric calculation the closest data point in distance to each baseline data point so that the data in each of the run segments is synchronized with the baseline segment of route run 202. Such calculation may be via the haversine or by other geometric calculations. The synchronized data, examples of which are shown as synchronized data lines 238 that extend perpendicularly to each of the route run lines, is now populated with latitude, longitude, test elevation, and distance from start point 218. Once the processing in synchronization module 46 is complete, the route run data is provided to analysis module 48.

Analysis module 48 averages the synchronized GPS data to determine the averaged elevation over the route run segment, represented by baseline run 202. Analysis module 48 may also perform other calculations, such as determining road radius, average road speed, average acceleration/deceleration analysis, etc. In some embodiments, analysis module 48 determine averages for the collected vehicle operating data (e.g., torque and engine speed, engine temperature, environmental temperature, stop-and-go and/or start-and-stop locations) to aid in control of a powertrain component of a vehicle. Experimentally, the Applicant has found that the error in grade data, which is useful for determining additional power required to climb hills and the reduction in power possible when moving down the backside of a slope, when measured in terms of standard deviation from the mean, drops by two-thirds after seven route runs. Applicant has also determined that the route data, particularly elevation, is sufficiently convergent or stable mathematically by ten runs that the data may be used to control the operation of an engine by way of vehicle control data transmitted from analysis module 48 to CEM module 20. While the exemplary embodiment uses ten route runs, the minimum number of runs that provides sufficiently convergent data is dependent on multiple factors, including the noise level of the GPS unit chosen, the location of the route, the smoothness of the road, and other factors that might increase or decrease noise in GPS unit output. Furthermore, if multiple data sources were available, such as data from an inclinometer (not shown), then the inclinometer data may be "fused" or analyzed in conjunction with the GPS data in a "sensor fusion," which can improve the analysis of road grade. Additionally, other processing techniques, such as non-linear analysis using spline fitting, may be used to provide useful results more quickly than merely taking the average of multiple runs over a route. Conversely, some GPS units may require more than ten runs over a route. However, given the current improvements in GPS technology, it is anticipated that the number of runs required over a single route may decrease with time. Because route identification system 10 uses previously gathered route data to control future operation of engine 32, route identification system 10 may be described as a system that uses or implements GPS data in forward-looking operation of engine 32.

Figure 4:
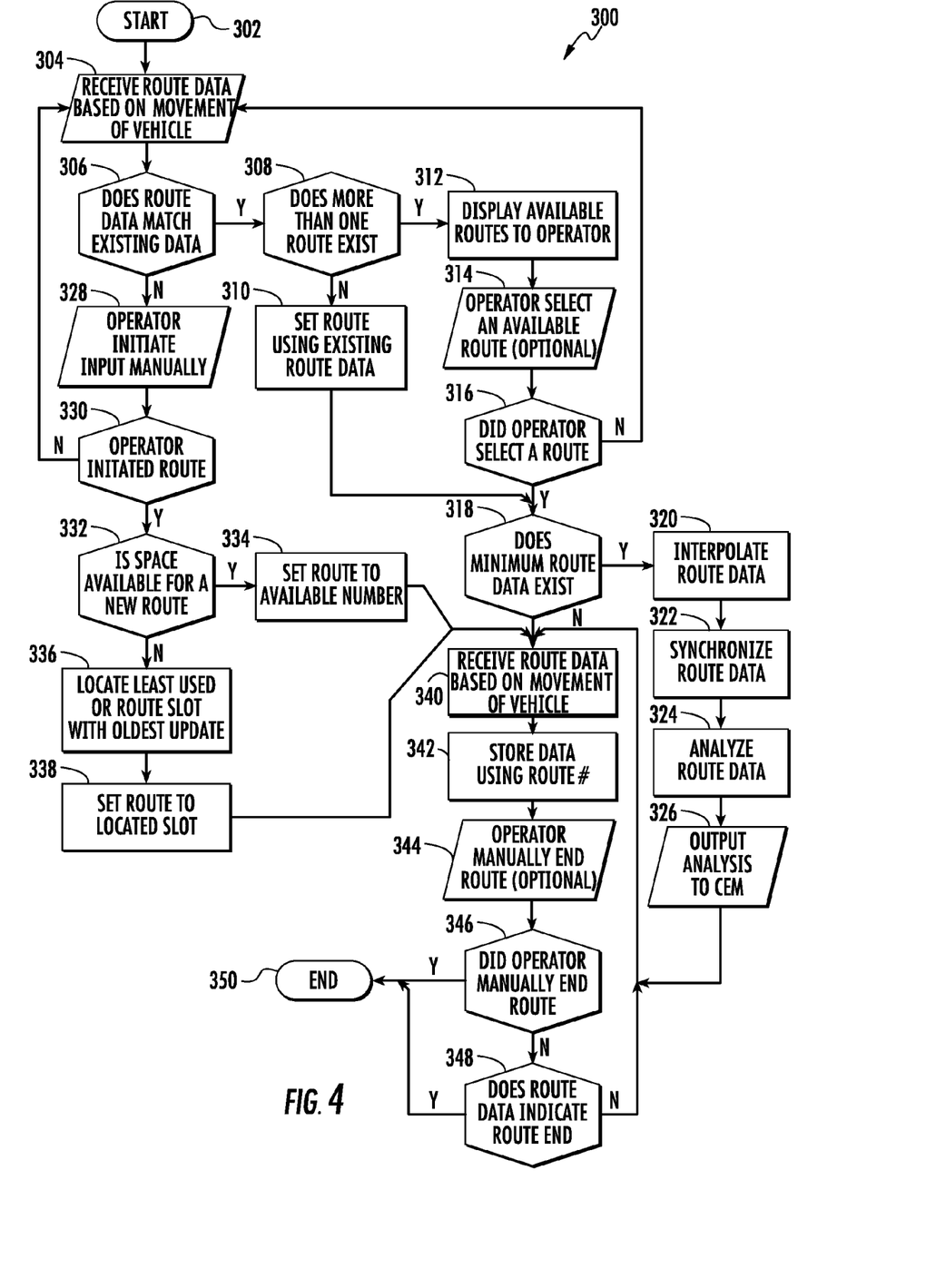
FIG. 4 is a route process flow diagram for a storage and analysis process of the DSPA module of FIG. 2 in accordance with an exemplary embodiment of the present disclosure.

Referring to FIG. 4, a route process flow diagram for route identification system 10 is shown and generally indicated at 300. Route process 300 may be located in one or more of the elements of route identification system 10, for example in DSAU 16, but may be located in other elements. Route process 300 is distributed through the various modules of DSPA module 40. Route process 300 begins with a process 302, where various portions of process 300 may be initialized, which may include setting initial variables, clearing registers and buffers, and other preliminary processes necessary for the proper function of process 300. From process 302, process 300 moves to a process 304, where route data (GPS and vehicle operating data) is received based on the movement of a vehicle. As mentioned above, each application of the system 10 receives or likely will receive different route data due to each vehicle traveling to different locations (e.g., different GPS data is collected by the system 10 for each vehicle because each vehicle travels along/defines different routes). Because the route data received is specific to each vehicle, each of the processes described herein in regard to process 300 are custom/specific to each application of process 300 (i.e., each vehicle that process 300 is utilized with).

At a decision process 306, route process 300 determines whether the route data based on the movement of the vehicle matches or substantially matches any existing route data. If the data from GPS unit 14 does match existing route data, route process 300 moves to a decision process 308. Because of the configuration of various roads, it is possible that more than one route may exist with overlapping portions. If route process 300 is able to limit the potential routes to one known route, route process 300 moves to a process 310, where the route is chosen using previously stored or existing route data in DSAU 16. The next step in route process 300 is a decision process 318, which determines whether minimum route data exists for analysis and engine control.

Returning to decision process 308, if more than one possible route exists, route process 300 moves to a process 312, where the available routes are provided to operator display portion 30 for presentation to the operator. Route process 300 then moves to an optional process 314, where route process 300 provides the operator with the operator to select one of the presented routes. If the operator does not select one of the presented routes within a limited period, which may be five to fifteen seconds, the route process 300 moves to a decision process 316. At decision process 316, route process 300 determines whether the operator chose one of the presented routes. If the operator did not select one of the presented routes, then route process 300 returns to process 304, which operates as previously described.

As described hereinabove, the minimum number of runs over an existing route in the exemplary embodiment is ten runs. If the minimum predetermined number of runs has been attained, route process 300 moves to a process 320. At process 320, the route data for the route is interpolated, as described hereinabove. The interpolated data is then synchronized at a process 322. The interpolated and synchronized data is then analyzed at a process 324, as described hereinabove. Once the route data has been analyzed, the process data is output to CEM module 20 at a process 326. As described hereinabove, CEM module 20 uses the processed GPS and vehicle operating data to control operation of a vehicle device (e.g., operator unit 18 and/or internal combustion engine 32). Control of the vehicle device may include control of one or more functions of a transmission associated with engine 32. Such control may include down shifting, up shifting, accelerating, decelerating, increasing engine cooling, increasing or decreasing an EGR temperature, and other engine functions that relate to road slopes, vehicle speed, road curvature, and other factors. Control may also include the transmission of the analyzed route data to operator display portion 30 as an operator alert or recommendation (i.e., instruction on how to operate the vehicle). For example, route identification system 10 may recommend decreasing speed rather than directly taking control of a vehicle based on historical GPS data and other factors, such as time of day and weather, in conditions where route identification system 10 has limited information regarding current conditions.

Route process 300 next moves to a process 340. Even though the minimum number of predetermined route runs has been attained, additional runs further improves the quality of the analysis, and process 340 continues receiving route data while traveling over the identified route. Though not shown, process 300 may also verify that the selected route is being followed and may send alerts to the operator via operator display portion 30 in the event of a deviation. Though not shown, route identification system 10 may also transmit an alert wirelessly to a base station or other system indicating significant deviations from an identified route or other issues identified by route identification system 10.

At a process 342, the route data obtained from GPS unit 14 is stored in DSAU 16 using the identified route number. Route process 300 then moves to an optional process 344. If route process 300 is able to identify the present route, then process 344 may be passed. However, an operator may also be able to select a new route end point and may assign a new route number using operator interface portion 28. Such operator inputs may be required in instances where a new route overlaps a previously existing route. Process 344 may also be set to time out so that if no stop or termination point is selected by the operator, route process 300 continues to a decision process 346.

At decision process 346, route process 300 determines whether an operator manually entered a stop or termination point. If the operator did not enter a stop or termination point manually, then process 300 moves to a decision process 348, where route process 300 determines whether route data indicates the stop or termination point of a route has been reached. If the stop or termination point has been reached, then route process 300 is finished and moves to a stop, end, or termination process 350. If route process 300 does not detect a stop or termination point, then route process 300 returns to process 340 where additional data is gathered. Processes 340 through 348 will continue until either an operator manually enters the end of the route, or until previously stored route data indicates the end of the route.

Returning to decision process 306, if route data does not match any known or existing route data, then route process 300 will move to a process 328, where route process 300 determines whether the operator has indicated the start or initiation of a route, which may be by way of operator interface portion 30 of operator unit 18. Regardless of whether the operator enters a start or initiation point, route process 300 moves to a decision process 330, where route process 300 determines whether the operator entered a route start or initiation point. If the operator did not enter a route start or initiation point, then route process 300 returns to process 304 to receive additional data. Processes 304, 306, 328, and 330 will continue until the GPS data based on the vehicle's movement matches an existing route, until the operator selects a route start or initiation point, or until route identification system 10 is unpowered, placed into standby, or otherwise de-energized or deactivated.

Returning to decision process 330, if the operator initiated a start point, the route process 300 moves to a decision process 332, where route process 300 determines whether space is available in DSAU 16 for a new route. If DSAU 16 contains sufficient space for a new route, then route process 300 moves to a process 334, where the route is set to an available route number. From process 334, route process 300 moves to process 340, which has been described hereinabove.

Returning to decision process 332, if route process 300 determines that insufficient space is available to save a new route, then route process 300 moves to a process 336. At a process 336, route process 300 examines all routes stored in DSAU 16 and determines which route is used the least, or which route has been unused for the longest period. Though not shown, route process 300 may also display least used routes, by number of trips, by length of time since the route was last traveled, or routes meeting other criteria, on operator display portion 30, and ask the operator to select a route to be overwritten. Regardless of the method, route process 300 next moves to a process 338, where route process 30 will set the route to the identified route number or location. Route process 300 then moves to process 340, described hereinabove.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. A route identification system, comprising:
   a GPS unit adapted to collect GPS data during an instance of a vehicle traveling a route;
   a processor configured to collect vehicle operating data during the instance of the vehicle traveling the route; and
   a storage unit adapted to receive the GPS and vehicle operating data in a non-transitory, computer-readable medium;
   wherein the processor is configured to control operation of a vehicle device during a subsequent instance of the vehicle traveling the route based on the GPS and vehicle operating data collected for a plurality of positions of the route during the prior instance of the vehicle traveling the route,
   wherein the processor interpolates the GPS and vehicle operating data after a predefined number of runs over the route before controlling operation of the vehicle device, and
   wherein the processor decreases the amount of interpolation as the number of runs over the route increases due to the aggregation of the GPS and vehicle operating data for the route.

2. The route identification system of claim 1, wherein the storage unit receives the GPS data at predetermined time intervals along the route.

3. The route identification system of claim 1, wherein a new route is identified by an operator input, and the new route is stored by the storage unit.

4. The route identification system of claim 3, wherein after a route is inputted into the storage unit, a route in a plurality of stored routes is identified by the processor determining that a received portion of the GPS and vehicle operating data substantially matches any stored route specific GPS and vehicle operating data.

5. The route identification system of claim 1, wherein the processor determines for each route in a plurality of routes, an average elevation of each route, an average vehicle speed, and an average acceleration/deceleration of the vehicle based on the received GPS and vehicle operating data.

6. The route identification system of claim 1, wherein the vehicle device includes at least one of a powertrain component of the vehicle and an operator unit, the powertrain component including at least one of an internal combustion engine, a transmission, and a final drive of the vehicle.

7. The route identification system of claim 1, wherein the processor includes a cycle efficiency management (CEM) module.

8. The route identification system of claim 1, wherein the GPS data includes, for the plurality of positions along the route, an indication of a latitude, a longitude, and an altitude measurement.

9. The route identification system of claim 8, wherein the processor is further configured to categorize and store the GPS and vehicle operating data for each route in a plurality of routes.

10. The route identification system of claim 8, wherein the processor is further configured to identify a route, in a plurality of routes, based on determining that a received portion of the GPS and vehicle operating data substantially matches any stored route specific GPS and vehicle operating data.

11. The route identification system of claim 1, wherein the vehicle operating data includes, for the plurality of positions along the route, when an up shifting and a down shifting occurs, a torque and an engine speed, an engine temperature, an environmental temperature, a stop-and-go location, and a start-and-stop location.

12. A route identification system, comprising:
    a processor configured to:
       collect GPS data during an instance of a vehicle traveling a route;
       collect vehicle operating data during the instance of the vehicle traveling the route;
       interpolate the GPS and vehicle operating data between adjacent received GPS and vehicle operating data points for the route;
       analyze the GPS and vehicle operating data to control operation of a vehicle device during a subsequent instance of the vehicle traveling the route based on the GPS and vehicle operating data collected for a plurality of positions of the route during the prior instance of the vehicle traveling the route,
       interpolate the GPS and vehicle operating data after a predefined number of runs over the route before controlling operation of the vehicle device, and
       decrease the amount of interpolation as the number of runs over the route increases due to the aggregation of the GPS and vehicle operating data for the route.

13. A computer-readable storage medium having machine instructions stored therein, the instructions being executable by a processor to cause the processor to perform operations, comprising:
    receiving GPS and vehicle operating data during an instance of a vehicle traveling a route in a plurality of routes;

interpolating the GPS and vehicle operating data between adjacent received GPS and vehicle operating data points for each route in the plurality of routes;

synchronizing the interpolated GPS and vehicle operating data to correspond with a specific route in the plurality of routes;

analyzing the interpolated and synchronized GPS and vehicle operating data over a plurality of runs of each route in the plurality of routes; and providing the interpolated, synchronized, and analyzed GPS and vehicle operating data to a controller to control operation of a vehicle device during a subsequent instance of the vehicle traveling the route, wherein the control is based on the GPS and vehicle operating data collected for a plurality of positions during the prior instance of the vehicle traveling the route, wherein interpolation of the GPS and vehicle operating data occurs after a predefined number of runs over the route before controlling operation of the vehicle device during the subsequent instance of the vehicle traveling the route, and wherein the amount of interpolation decreases as the number of runs over the route increases due to the aggregation of the GPS and vehicle operating data for the route.

14. The computer-readable storage medium of claim 13, further comprising receiving an operator input to identify a route in the plurality of routes.

15. The computer-readable storage medium of claim 13, further comprising determining an identity of a route in the plurality of routes based the received GPS and vehicle operating data substantially matching stored route specific GPS and vehicle operating data.

16. The computer-readable storage medium of claim 13, wherein the analyzing includes determining an average elevation of each route, an average vehicle speed, and an average acceleration/deceleration of the vehicle.

* * * * *